United States Patent Office 3,277,031
Patented Oct. 4, 1966

3,277,031
PLASTICIZED COMPOSITIONS COMPRISING A POLYESTER OF HYDRACRYLIC ACID, AND A CELLULOSE ESTER
Paule Valls, Paris, Robert Soulas, Noisy-le-Grand, and Yves Etienne, Paris, France, assignors to Eastman Kodak Company, Rochester, N.Y., a corporation of New Jersey
No Drawing. Filed Feb. 14, 1963, Ser. No. 258,601
Claims priority, application France, July 13, 1962, 903,912
4 Claims. (Cl. 260—13)

The present invention relates to plasticized compositions, and more particularly to plasticized compositions containing a cellulose ester and a high molecular weight polyester.

Although plasticizers are required to have a number of desirable properties, often difficult properties to obtain are good compatibility of the plasticizer with the composition to be plasticized, and low volatility. Previously, plasticizers possessing these critical properties have generally had a molecular weight of less than about 300, and in many instances considerably less than 300. Hence, it has been thought that higher weight molecular compositions were generally unsatisfactory as plasticizers, particularly in cellulose ester compositions.

One object of our invention is to provide high molecular weight plasticizers for cellulose ester compositions. Another object of our invention is to provide compositions comprising high molecular weight polyester and lower fatty acid ester of cellulose. A further object of our invention is to provide cellulose ester film base plasticized with high molecular weight polyester. Other objects of our invention will appear herein.

These and other objects of our invention are accomplished by a composition comprising a lower fatty acid ester of cellulose, the acyl groups of which contain 2–4 carbon atoms, and a polyester of hydracrylic acid having a molecular weight of at least 10,000, and a viscosity in methylene chloride at 25° C. of more than 0.5 and preferably 1.0 to 2.0.

We have found that the lower fatty acid esters of cellulose are compatible in all proportions with the high molecular weight polyesters of hydracrylic acid. We have also found that these compositions have excellent properties with regard to exudation. That is, the compositions in accordance with our invention are highly stable and the constituents thereof do not exude or volatilize from the compositions.

The polyesters which we employ in the compositions of our invention, and the preparation thereof, are disclosed in U.S. patent application Serial No. 258,602, filed of even date, in the name of Etienne, Soulas, and Thiebaut. These polyesters consist essentially of the following structural recurring unit:

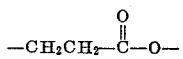

These polyesters may be prepared in any convenient manner, such as the methods described in the Etienne et al. patent application referred to above. For example, monomeric beta-propiolactone may be subjected to polymerization conditions in contact with a betaine-type compound as catalyst, allowing the reaction to progress to substantial completion in order to produce the desired high molecular weight polyester. If desired, a solvent or diluent may be employed to facilitate the recovery of the polyester from the reaction mixture. The temperature of the polymerization reaction may be effected over rather wide limits, but from about 0° C. to about 60° or 65° C. is preferred.

The cellulose esters which are employed in the compositions in accordance with the invention are the esters of fatty acids of 2–4 carbon atoms. The cellulose esters may be esterified with one acyl group or with mixed acyl groups. Thus, useful compositions may be obtained by incorporating the polyester of hydracrylic acid with cellulose acetate, cellulose propionate, cellulose butyrate, cellulose acetate propionate, and cellulose acetate butyrate. We have found that the plasticized compositions in accordance with our invention which have the most desirable properties are those which contain substantially completely esterified cellulose esters. For example, compositions of cellulose triacetate and the high molecular weight polyester of hydracrylic acid produce highly useful plastic compositions.

The ratio of cellulose ester to high molecular weight polyester of hydracrylic acid may be varied over an infinite range in accordance with our invention to produce highly useful compositions. In other words, the high molecular weight polyesters of hydracrylic ester are compatible in all proportions with the lower fatty acid esters of cellulose. When the major proportion of the plastic composition consists of a cellulose ester, the polyester of hydracrylic acid may be regarded as plasticizing the cellulose ester. On the other hand, when the major portion of the composition is the polyester of hydracrylic acid, the cellulose ester may be regarded as plasticizing the polyester.

Our invention will be further illustrated by the following examples, which show plasticized compositions comprising cellulose triacetate and a high molecular weight polyester of hydracrylic acid. The properties of the compositions thus obtained are also compared with cellulose triacetate compositions plasticized with conventional plasticizers.

Example 1

Two dopes were prepared with the following formulas:

|  | Formula A | Formula B |
|---|---|---|
|  | Grams | Grams |
| Cellulose triacetate | 150 | 150 |
| Methylene chloride | 895 | 895 |
| Methanol | 59 | 59 |
| Triphenylphosphate | 22.5 | 0 |
| Propiolactone polymer having an intrinsic viscosity of 1.6 determined in methylene chloride at 25° C | 0 | 22.5 |

The 0.14 cm. thick film obtained from such dopes by casting on glass showed the following properties:

|  | Formula A | Formula B |
|---|---|---|
| Tensile strength (kg./mm.²) | 10.5 | 9.6 |
| Elongation before breaking (percent) | 39 | 38 |
| Tear resistance (g.) | 40 | 44 |
| Elongation in water (percent) | 0.77 | 1.11 |

Example 2

46 g. of butanol were added to Formulas A and B of Example 1 and the dopes were cast on glass. The films obtained were 0.15 cm. thick and had the following properties:

|  | A | B |
|---|---|---|
| Tensile strength (kg./mm.²) | 10 | 10.2 |
| Elongation before breaking (percent) | 39 | 43 |
| Tear resistance (g.) | 38 | 55 |
| Elongation in water (percent) | 0.85 | 1.08 |

Example 3

Films 50 microns thick were obtained from the A and B dopes of Example 2. They were submitted to sudden pull of various energies. The film plasticized with the polyester of the invention (Formula B) was broken with an impulse slightly higher than 160 g./m. It then showed a permanent elongation of 0.6% and was not distorted. For the same impulse the film plasticized with triphenylphosphate (Formula A of Example 2) showed a permanent elongation of 1.6%.

Example 4

Two dopes were prepared from the following formulas:

|  | Formula 1 | Formula 2 |
|---|---|---|
|  | Grams | Grams |
| Cellulose acetate butyrate (approx. 17% butyryl and 30% acetyl) | 250 | 250 |
| Methylene chloride | 1,197 | 1,197 |
| Butanol | 80 | 80 |
| Triphenylphosphate | 20 | 0 |
| Propiolactone polymer having an intrinsic viscosity in methylene chloride at 25° C. of 0.90 | 0 | 20 |

The 0.14 cm. thick film obtained by casting these comportions on glass had the following properties:

|  | Formula 1 | Formula 2 |
|---|---|---|
| Tensile strength (kg./mm.²) | 7.3 | 7.2 |
| Elongation before breaking (percent) | 22 | 23 |
| Tear resistance (g.) | 30 | 29 |
| Elongation in water (percent) | 0.62 | 0.70 |

The compositions of our invention may, as indicated above, be cast into films which are useful in various applications, such as photographic film base. The compositions may also be molded or extruded with conventional techniques to provide useful articles. The compositions of the invention may contain other ingredients, including auxiliary plasticizers, pigments, stabilizers and the like.

The invention has been described in detail with particular reference to preferred embodiments thereof but it will be understood that variations and modifications can be effected within the spirit and scope of the invention as described hereinabove and as defined in the appended claims.

We claim:
1. A plasticized composition of matter comprising a mixture of a lower fatty acid ester of cellulose and a polyester of hydracrylic acid having a molecular weight of at least about 10,000.
2. A plasticized composition of matter comprising a mixture of a lower fatty acid ester of cellulose and a polyester of hydracrylic acid having an intrinsic viscosity of at least 0.5 measured in methylene chloride at 25° C.
3. A plasticized composition of matter comprising a mixture of a substantially fully esterified lower fatty acid ester of cellulose, the acyl groups of which contain 2–4 carbon atoms, and a polyester of hydracrylic acid having an intrinsic viscosity of at least 0.5 measured in methylene chloride at 25° C.
4. A plasticized composition of matter comprising a mixture of cellulose triacetate and a polyester of hydracrylic acid having an intrinsic viscosity of at least 0.5 measured in methylene chloride at 25° C.

References Cited by the Examiner
UNITED STATES PATENTS

| 1,995,970 | 3/1955 | Dorough | 260—13 |
| 2,721,784 | 10/1955 | Daul et al. | 260—13 |

WILLIAM H. SHORT, *Primary Examiner.*

J. NORRIS, *Assistant Examiner.*